United States Patent
Vasudevan

(10) Patent No.: US 10,142,231 B2
(45) Date of Patent: Nov. 27, 2018

(54) TECHNOLOGIES FOR NETWORK I/O ACCESS

(71) Applicant: Intel Corporation, Santa Clara, CA (US)

(72) Inventor: Anil Vasudevan, Portland, OR (US)

(73) Assignee: Intel Corporation, Santa Clara, CA (US)

(*) Notice: Subject to any disclaimer, the term of this patent is extended or adjusted under 35 U.S.C. 154(b) by 94 days.

(21) Appl. No.: 15/087,527

(22) Filed: Mar. 31, 2016

(65) Prior Publication Data

US 2017/0289036 A1    Oct. 5, 2017

(51) Int. Cl.
H04L 12/747    (2013.01)
H04L 12/743    (2013.01)
H04L 12/873    (2013.01)
G06F 13/40     (2006.01)

(52) U.S. Cl.
CPC ........ *H04L 45/742* (2013.01); *G06F 13/4022* (2013.01); *H04L 45/7453* (2013.01); *H04L 47/522* (2013.01)

(58) Field of Classification Search
None
See application file for complete search history.

(56) References Cited

U.S. PATENT DOCUMENTS 6,973,026 B1    10/2005  Dyrga et al.
2006/0195698 A1  8/2006  Pinkerton et al.
2012/0072624 A1*  3/2012  Droux ............... G06F 13/4022
                                                    710/39
2012/0089707 A1   4/2012  Baba et al.
2013/0044636 A1*  2/2013  Koponen ............... H04L 47/12
                                                    370/254

(Continued)

FOREIGN PATENT DOCUMENTS

JP    2013069063    4/2013
JP    2015184960   10/2015

OTHER PUBLICATIONS

International search report for PCT application No. PCT/US2017/020227, dated Jun. 2, 2017 (3 pages).

(Continued)

Primary Examiner — Albert T Chou
(74) Attorney, Agent, or Firm — Barnes & Thornburg LLP

(57) ABSTRACT

Technologies for accelerating non-uniform network input/output accesses include a multi-home network interface controller (NIC) of a network computing device communicatively coupled to a plurality of non-uniform memory access (NUMA) nodes, each of which include an allocated number of processor cores of a physical processor package and an allocated portion of a main memory directly linked to the physical processor package. The multi-home NIC includes a logical switch communicatively coupled to a plurality of logical NICs, each of which is communicatively coupled to a corresponding NUMA node. The multi-home NIC is configured to facilitate the ingress and egress of network packets by determining a logical path for each network packet received at the multi-home NIC based on a relationship between one of the NUMA nodes and/or a logical NIC (e.g., to forward the network packet from the multi-home NIC) coupled to the one of the NUMA nodes. Other embodiments are described herein.

25 Claims, 5 Drawing Sheets

(56) References Cited

U.S. PATENT DOCUMENTS

| | | | |
|---|---|---|---|
| 2013/0055270 A1* | 2/2013 | Dabagh | G06F 15/1735 718/102 |
| 2014/0254594 A1* | 9/2014 | Gasparakis | H04L 45/74 370/392 |
| 2014/0376560 A1* | 12/2014 | Senniappan | H04L 49/25 370/401 |
| 2015/0067229 A1* | 3/2015 | Connor | G06F 13/4022 710/317 |
| 2015/0242324 A1* | 8/2015 | Novakovic | G06F 12/0813 711/121 |
| 2016/0057066 A1 | 2/2016 | Gasparakis et al. | |
| 2016/0092259 A1* | 3/2016 | Mehta | G06F 9/45558 718/1 |

OTHER PUBLICATIONS

Written opinion for PCT application No. PCT/US2017/020227, dated Jun. 2, 2017 (8 pages).

* cited by examiner

TECHNOLOGIES FOR NETWORK I/O ACCESS

BACKGROUND

Demands by individuals, researchers, and enterprise for increased compute performance and storage capacity of computing devices have resulted in various computing technologies having been developed to address those demands. For example, compute intensive applications, such as enterprise cloud-based applications (e.g., software as a service (SaaS) applications), data mining applications, data-driven modeling applications, scientific computation problem solving applications, etc., typically rely on complex, large-scale computing environments, such as high-performance computing (HPC) environments and cloud computing environments, to execute the compute intensive applications, as well as store the voluminous amount of data. Such large-scale computing environments can include tens of thousands of multi-processor/multi-core computing devices connected via high-speed interconnects.

To carry out such processor intensive computations, various computing technologies have been implemented to distribute the workload, such as parallel computing, distributed computing, etc. To support the computing technologies, advancements in hardware have been introduced as well. For example, multiprocessor hardware architecture (e.g., multiple central processing units (CPUs) that share memory) has been developed to allow multiprocessing (e.g., coordinated, simultaneous processing by more than one processor, or CPU). In such multiprocessor hardware architectures, different parallel computer memory design architectures may be deployed: shared memory architecture (e.g., uniform memory access (UMA) and non-uniform memory access (NUMA) and distributed memory architecture. However, present technologies are generally optimized from a CPU perspective (e.g., to increase processor speed without increasing the load on the processor bus), not shared, high-speed I/O devices, such as network I/O devices.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
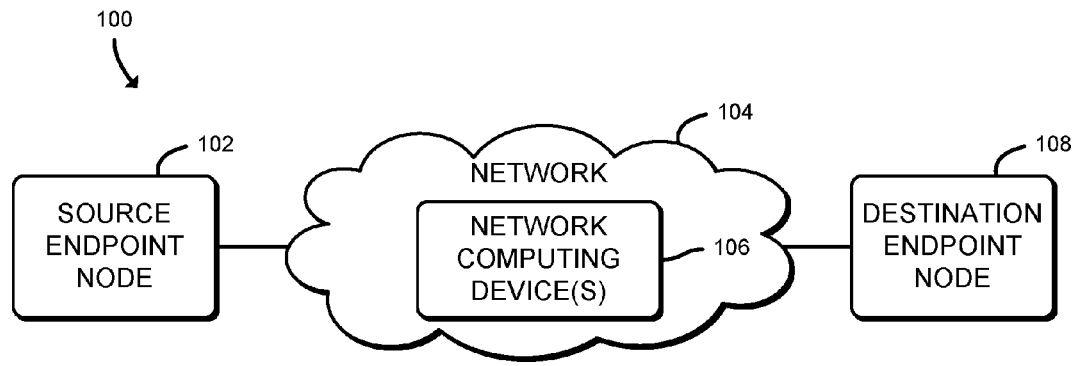
FIG. 1 is a simplified block diagram of at least one embodiment of a system for non-uniform network I/O access acceleration that includes one or more network computing devices.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media (e.g., memory, data storage, etc.), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for accelerating non-uniform network I/O access includes a source endpoint node 102 communicatively coupled to a destination endpoint node 108 via a network computing device 106 of a network 104. While only a single network computing device 106 is shown in the network 104 of the illustrative system 100, it should be appreciated that the network 104 may include a plurality of network computing devices 106 configured in various architectures. In use, the network computing device 106 performs various operations (e.g., services, computations, etc.) on network traffic (e.g., network packets, messages, etc.) received at the network computing device 106 prior to storing, forwarding, or dropping the packet. To execute the various operations, the network computing device 106 relies on one or more physical processor packages (see, e.g., processor (1) 202 and processor (2) 208 of FIG. 2) of the network computing device 106.

Figure 2:
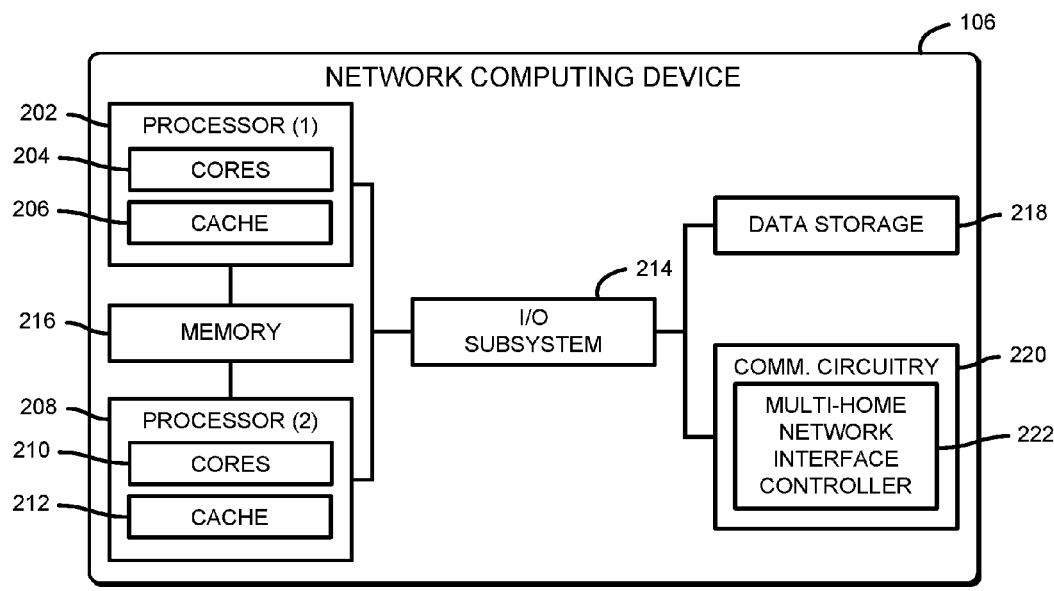
FIG. 2 is a simplified block diagram of at least one embodiment of the network computing device of the system of FIG. 1 that includes a multi-home network interface controller (NIC)
Figure 3:
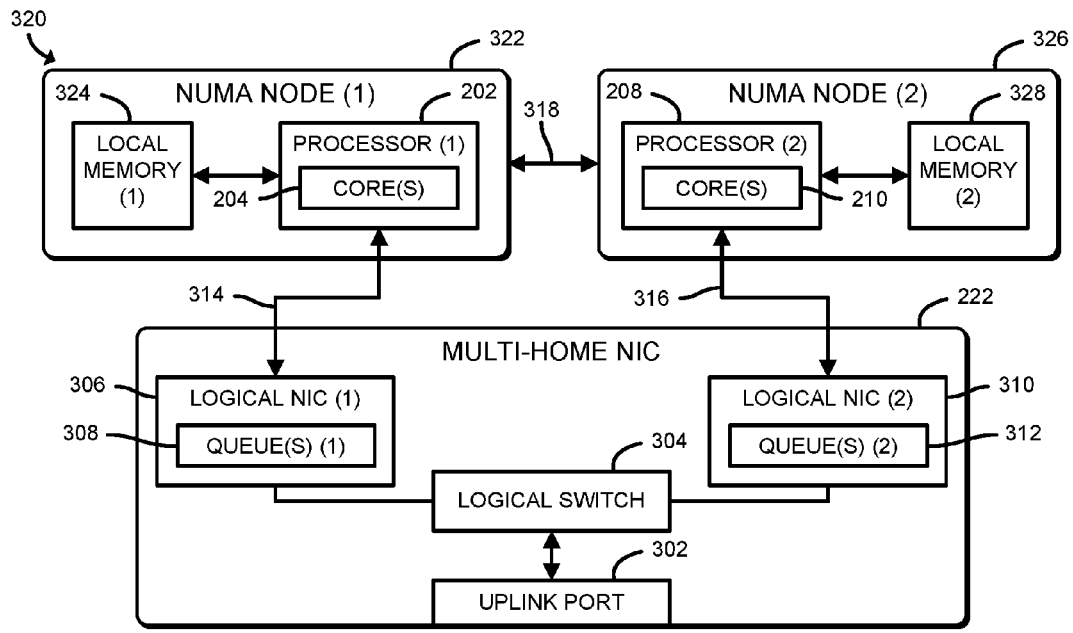
FIG. 3 is a simplified block diagram of at least one embodiment of the multi-home NIC of the network computing device of FIG. 2 communicatively coupled to non-uniform memory access (NUMA) nodes that each includes components of the network computing device of FIG. 2.

Upon receiving a network packet for processing at a network interface controller (NIC) of the network computing device 106, the network computing device 106 is configured to transmit the received network packet (e.g., from the NIC) to an appropriate non-uniform memory access (NUMA) node (see, e.g., the NUMA nodes 320 of FIG. 3). As will be described in further detail below, each NUMA node includes a number of allocated processor cores of a physical processor package, referred to herein as a processor (see, e.g., the processor cores 204 of processor (1) 202 and the processor cores 210 of processor (2) 208, as shown in FIGS. 2 and 3). Each NUMA node additionally includes an allocated portion of main memory (e.g., a portion of the memory 216 of FIG. 2) allocated to the processor cores of the respective NUMA node and directly linked to the physical processor package on which the processor cores reside. Such allocated memory is commonly referred to as local memory (see, e.g., the local memory (1) 324 of NUMA node (1) 322 and the local memory (2) 328 of NUMA node (2) 326, as shown in FIG. 3) relative to the NUMA node for which the memory has been allocated. It should be appreciated that the local memory of one NUMA node is remote, or foreign, relative to the other NUMA nodes.

However, unlike existing technologies, the NIC of the network computing device 106 (see, e.g., the multi-home NIC 222 of FIG. 2) is configured to manage a logical switch (see, e.g., the logical switch 304 of FIG. 3) and two or more logical NICs (see, e.g., the logical NIC (1) 306 and the logical NIC (2) 310 of FIG. 3) physically connected to one of the NUMA nodes 320. It should be appreciated that each logical NIC is an instantiation of a NIC interface that is physically connected to a NUMA node. In other words, the logical NIC is an abstraction for each socket (NUMA node) that presents itself a local NIC interface that is physically attached.

Accordingly, unlike existing technologies deploying multiple physical NICs wherein each physical NIC is physically connected to a respective one of the NUMA nodes (see, e.g., the typical NIC 400 embodiment of FIG. 4), NUMA optimized queues from the multiple logical NICS can be shared, as well as queue selection methods for ingress and egress of network packets can take NUMA configuration into consideration. Additionally, using multiple logical NICs per physical NIC can support fewer uplink port configurations (e.g., fewer data cables to top of rack switch ports). Further, in such embodiments, present technologies to make multiple physical NICs appear as a single NIC generally require using layer 2 (e.g., the data link layer of the open source interconnection (OSI) model) link aggregation, whereas the multiple logical NICs can achieve the equivalent link algorithms at layer 3 (e.g., the network layer of the OSI model), rather than layer 2.

In use, the logical switch receives the network packet and determines which logical NIC to forward the network packet to. The logical switch is configured to determine which logical NIC based on a processor or processor core of the NUMA node that the network packet has been mapped to. The logical NICs are configured to receive the network packet and insert into an applicable work queue for transmission to the appropriate NUMA node. Accordingly, by having a logical NIC mapped to a particular NUMA node, the network packet may be processed using the local memory allocated for the NUMA node (e.g., allocated for the processor cores of the NUMA node). In other words, the network packet may not require use of remote memory (e.g., foreign memory allocated to another NUMA node), which could increase load/contention on the interconnect (see, e.g., the interconnect 318 of FIG. 3) between the NUMA nodes, as well as decrease overall bandwidth and increase latency to memory.

The logical NICs are further configured to receive a network packet for forwarding to a target computing device, such as may be received from one of the NUMA nodes. Ideally, the logical NIC is a locally homed logical NIC (e.g., is the logical NIC attached to the NUMA node from which the network packet has been received. In use, the logical NIC (e.g., the locally home logical NIC or a remotely homed logical NIC) receives the packet and determines a queue in which to enqueue the received network packet for transmission to the logical switch. Upon receipt by the logical switch, the logical switch is configured to forward the network packet to a target computing device (e.g., the destination endpoint node 108 or another network computing device 106).

The network computing device 106 may be embodied as any type of network traffic processing device that is capable of performing the functions described herein, such as, without limitation, a server (e.g., stand-alone, rack-mounted, blade, etc.), a network appliance (e.g., physical or virtual), a switch (e.g., rack-mounted, standalone, fully managed, partially managed, full-duplex, and/or half-duplex communication mode enabled, etc.), a router, a web appliance, a distributed computing system, a processor-based system, and/or a multiprocessor system. As shown in FIG. 2, the illustrative network computing device 106 includes a first processor, designated as processor (1) 202, a second processor, designated as processor (2) 208, an input/output (I/O) subsystem 214, a memory 216, a data storage device 218, and communication circuitry 220. Of course, the network computing device 106 may include other or additional components, such as those commonly found in a computing device, in other embodiments. Additionally, in some embodiments, one or more of the illustrative components may be incorporated in, or otherwise form a portion of, another component. For example, the memory 206, or portions thereof, may be incorporated in one or both of the processors 202, 208 in some embodiments. Further, in some embodiments, one or more of the illustrative components may be omitted from the network computing device 106. For example, although the illustrative network computing device 106 includes two processors 202, 208, the network computing device 106 may include a greater number of processors, in other embodiments.

Each of the processors 202, 208 may be embodied as any type of processor capable of performing the functions described herein, such as, but not limited to, a single physical multi-processor core chip, or package. The illustrative processor (1) 202 includes a number of processor cores 204, while the illustrative processor (2) 208 similarly includes a number of processor cores 210. As described previously, each of the processors 202, 208 includes more than one processor. Accordingly, in some embodiments, the processor cores 204, 210 may include 2 processors, 4 processors, 8 processors, 16 processors, or more processors, for example.

Each of processor cores 204, 210 is embodied as an independent logical execution unit capable of executing programmed instructions. In some embodiments, the processor cores 204, 210 may include a portion of cache memory (e.g., an L1 cache) and functional units usable to independently execute programs or threads. It should be appreciated that in some embodiments of the network computing device 106, such as supercomputers, the network computing device 106 may include thousands of processor cores. Each of the processors 202, 208 may be connected to a physical connector, or socket, on a motherboard (not shown) of the network computing device 106 configured to accept a single physical processor package (e.g., a multi-core physical integrated circuit). It should be appreciated that the socket as referred to herein is a physical socket, not a network socket (e.g., an Internet socket, a transmission control protocol (TCP) socket, etc.).

The illustrative processor (1) 202 additionally includes a cache memory 206. Similarly, the illustrative processor (2) 208 also includes a cache memory 212. Each cache memory 206, 212 may be embodied as any type of cache that the respective processor 202, 208 can access more quickly than the memory 216 (e.g., the main memory), such as an on-die cache, or on-processor cache. In other embodiments, the cache memory 206, 212 may be an off-die cache, but reside on the same system-on-a-chip (SoC) as the respective processor 202, 208. It should be appreciated that, in some embodiments, the cache memory 206, 212 may have a multi-level architecture. In other words, in such multi-level architecture embodiments, the cache memory 206, 212 may be embodied as an L1, L2, or L3 cache, for example.

The memory 216, or main memory, may be embodied as any type of volatile or non-volatile memory or data storage capable of performing the functions described herein. In operation, the memory 216 may store various data and software used during operation of the network computing device 106, such as operating systems, applications, programs, libraries, and drivers. The illustrative memory 216 is communicatively coupled to the processors 202, 208. Accordingly, it should be appreciated that the network computing device 106 additionally includes a memory controller (not shown), which may be integrated into the processors 202, 208 (e.g., an integrated memory controller) or contained on other circuitry and/or components, such as the I/O subsystem 214.

The I/O subsystem 214 may be embodied as circuitry and/or components to facilitate I/O operations with the processors 202, 208, the memory 216, and/or other components of the network computing device 106. For example, the I/O subsystem 214 may be embodied as, or otherwise include, memory controller hubs, input/output control hubs, firmware devices, communication links (e.g., point-to-point links, bus links, wires, cables, light guides, printed circuit board traces, etc.) and/or other components and subsystems to facilitate the input/output operations. In some embodiments, the I/O subsystem 214 may form a portion of a SoC and be incorporated, along with one or both of the processors 202, 208, the memory 216, and/or other components of the network computing device 106, on a single integrated circuit chip.

The data storage device 218 may be embodied as any type of device or devices configured for short-term or long-term storage of data such as, for example, memory devices and circuits, memory cards, hard disk drives, solid-state drives, or other data storage devices. It should be appreciated that the data storage device 218 and/or the memory 216 (e.g., the computer-readable storage media) may store various data as described herein, including operating systems, applications, programs, libraries, drivers, instructions, etc., capable of being executed by a processor (e.g., the processor 202, the processor 208, etc.) of the network computing device 106.

The communication circuitry 220 may be embodied as any communication circuit, device, or collection thereof, capable of enabling communications between the network computing device 106 and other computing devices (e.g., the source endpoint node 102, the destination endpoint node 108, another network computing device, etc.) over a network (e.g., the network 104). The communication circuitry 220 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

The illustrative communication circuitry 220 includes a multi-home NIC 222. The multi-home NIC 222 may be embodied as one or more add-in-boards, daughtercards, network interface cards, controller chips, chipsets, or other devices that may be used by the network computing device 106. For example, in some embodiments, the multi-home NIC 222 may be integrated with one or both of the processors 202, 208, embodied as an expansion card coupled to the I/O subsystem 214 over an expansion bus (e.g., PCI Express), part of a SoC that includes one or more processors, or included on a multichip package that also contains one or more processors. Additionally or alternatively, in some embodiments, functionality of the multi-home NIC 222 may be integrated into one or more components of the network computing device 106 at the board level, socket level, chip level, and/or other levels.

Referring again to FIG. 1, the source endpoint node 102 and/or the destination endpoint node 108 may be embodied as any type of computation or computer device capable of performing the functions described herein, including, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a server (e.g., stand-alone, rack-mounted, blade, etc.), a network appliance (e.g., physical or virtual), a web appliance, a distributed computing system, a processor-based system, and/or a multiprocessor system. Accordingly, it should be appreciated that the source endpoint node 102 and/or the destination endpoint node 108 may include like and/or similar components to the components of the illustrative network computing device 106 of FIG. 2, such as a processor, an I/O subsystem, memory, a data storage device, communication circuitry, etc. As such, further descriptions of the like components are not repeated herein with the understanding that the description of the corresponding components provided above in regard to the illustrative network computing device 106 of FIG. 2 applies equally to the corresponding components of the source endpoint node 102 and/or the destination endpoint node 108.

The network 104 may be embodied as any type of wired or wireless communication network, including a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, etc.), as needed to facilitate communication between the source endpoint node 102 and the destination endpoint node 108, which are not shown to preserve clarity of the description.

Referring now to FIG. 3, in an illustrative embodiment, the multi-home NIC 222 of FIG. 2 is communicatively coupled to a first NUMA node, designated as NUMA node (1) 322, and a second NUMA node, designated as NUMA node (2) 326, which are collectively referred to herein as NUMA nodes 320. It should be appreciated that, in other embodiments, there may be more than two NUMA nodes depending on the number of processors and processor cores available, as well as other hardware vendor specific enablements/restrictions. Unlike traditional technologies in which a single physical NIC (see, e.g., the typical NIC 400 of FIG. 4) is connected to a single NUMA node, the multi-home NIC 222 is a physical NIC connected to multiple NUMA nodes via corresponding logical NICs. As described previously, each logical NIC is an instantiation of a NIC interface that is physically connected to a NUMA node. In other words, as also described previously, the logical NIC is an abstraction for each NUMA node that presents itself a local NIC interface such that the NUMA nodes can be physically attached to the multi-home NIC 222. It should be appreciated that, in some embodiments, since each of the logical NICs is instantiated on the physical multi-home NIC 222, the communicative coupling between the logical NICs and the NUMA nodes may be an abstracted virtual connection between the respective NUMA node and the corresponding logical NIC across a physical connection between the respective NUMA node and the multi-home NIC 222.

The illustrative multi-home NIC 222 includes an uplink port 302, a logical switch 304, a first logical NIC designated as logical NIC (1) 306, and a second logical NIC designated as logical NIC (2) 310. It should be further appreciated that the network computing device 106 may include additional and/or alternative components, sub-components, and/or devices commonly found in a computing device or a NIC of the computing device in a NUMA node architecture (e.g., a memory controller), which are not illustrated in FIG. 3 for clarity of the description. The uplink port 302 is configured to connect the multi-home NIC 222 to other network computing devices 106 for the purpose of receiving/forwarding network packets. The logical switch 304 is communicatively coupled to each of the logical NICS 306, 310. The illustrative logical NIC (1) 306 includes one or more queues (1) 308. Similarly, the illustrative logical NIC (2) 310 includes one or more queues (2) 312. Each of the queues 308, 312 may include one or more work queues, network packet processing queues, network packet transmission queues, and/or any other type of queue usable by the logical NICs 306, 310 to receive, process, and/or forward network traffic.

Each of the logical NICs 306, 310 is communicatively coupled to a respective one of the NUMA nodes 320 via physical connections to a host interface of the logical NICs 306, 310. The illustrative logical NIC 306 is connected to the NUMA node (1) 322 via physical connection 314; while the illustrative logical NIC 310 is connected to the NUMA node (2) 326 via physical connection 314. It should be appreciated that each of the physical connections 314, 316 are physical connections between the NUMA nodes and logical NIC host interfaces exposed by the multi-home NIC 222. In such a configuration, the logical NIC coupled to the NUMA node is considered the locally homed logical NIC relative to that NUMA node. Similarly, the logical NIC not coupled to the NUMA node is considered a remotely homed logical NIC relative to that NUMA node. For example, the locally homed logical NIC of the NUMA node (1) 322 is the logical NIC (1) 306, whereas the locally homed logical NIC of the NUMA node (2) 326 is the logical NIC (2) 310. Similarly, the remotely homed logical NIC of the NUMA node (1) 322 is the logical NIC (2) 310, whereas the remotely homed logical NIC of the NUMA node (2) 326 is the logical NIC (1) 306.

Accordingly, if one of the logical NICs receives a network packet to be processed by a remote processor (e.g., a processor of a NUMA node not directly coupled to the logical NIC) the network packet is transmitted to the NUMA node directly coupled to the logical NIC and transmitted across an interconnect between the NUMA nodes (see, e.g., the interconnect 318). The interconnect 318 is configured to transmit network packets between the NUMA nodes 320. It should be appreciated that network traffic transmitted over the interconnect 318 may introduce load/contention, increase overall bandwidth usage, and reduce latency associated with accesses to remote memory, as compared to network packets being processed along a locally homed control path.

To reduce such network traffic being processed along a remotely homed control path, the logical switch 304 is configured to determine a locally homed control path, which is described in detail below. In other words, the multi-home NIC 222 can identify the applicable locally homed control path (e.g., a mapped logical NIC and processor) for each of the received network packets to be processed. In an illustrative example, a network packet received by the logical switch 304 to be processed by the NUMA node (2) 326 is transmitted by the logical switch 304 to the appropriate logical NIC, or locally homed logical NIC. In this illustrative example, the locally homed logical NIC is the logical NIC (2) 310. Accordingly, the switch 304 can transmit the network packet to the logical NIC (2) 310 for insertion into an appropriate one of the queues 312 of the logical NIC (2) 310. As such, unnecessary traffic is not transmitted across the interconnect 318, thereby reducing load/contention, as well as decreasing overall bandwidth usage and reducing latency associated with accesses to remote memory.

Figure 4:
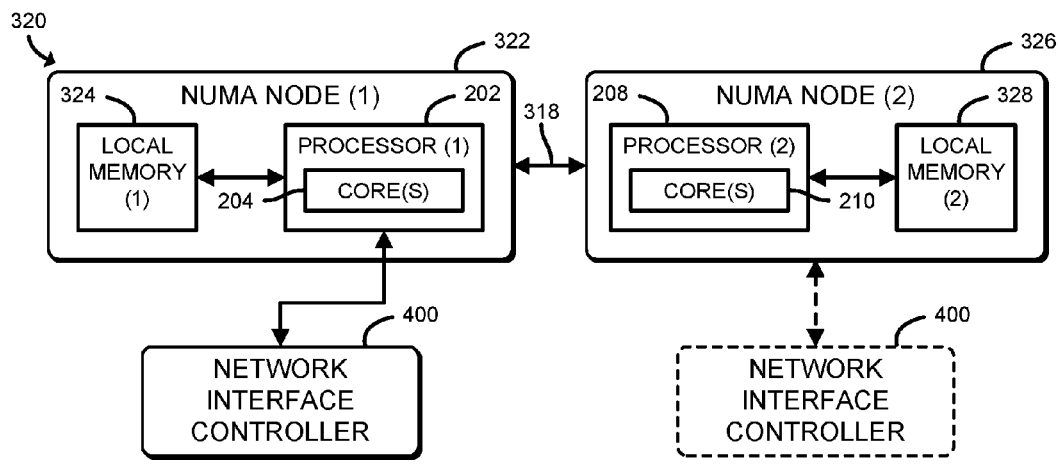
FIG. 4 is a simplified block diagram of a typical NIC communicatively coupled to the NUMA nodes of FIG. 3.

Referring now to FIG. 4, a typical NIC of a network computing device 106 is shown communicatively coupled to a single NUMA node (e.g., NUMA node (1) 322). Because traditional technologies using NUMA implementations are directed toward CPU/memory access optimization, rather than I/O devices such as the typical NIC 400, inbound and outbound network traffic must first travel through NUMA node (1) 322, regardless of whether it is intended to be processed by the processor (1) 202 of the NUMA node (1) 322 or the processor (2) 208 of the NUMA node (2) 326. As such, unnecessary traffic may be transmitted across the interconnect 318, thereby potentially increasing load/contention, as well as potentially increasing overall bandwidth usage and latency associated with accesses to the remote memory (e.g., the local memory (2) 328 with respect to the processor (1) 202).

Figure 5:
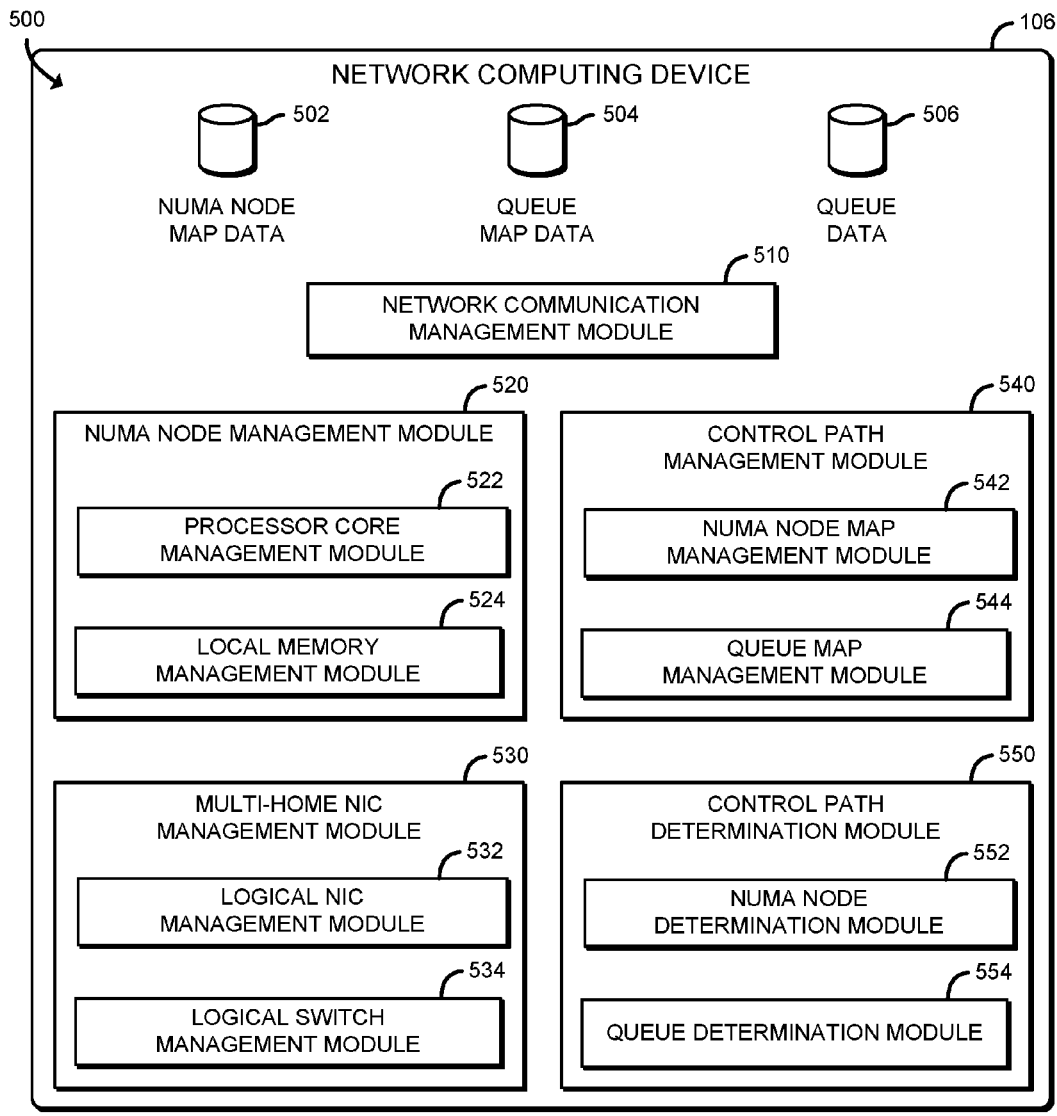
FIG. 5 is a simplified block diagram of at least one embodiment of an environment that may be established by the network computing device of FIG. 2.

Referring now to FIG. 5, in an illustrative embodiment, the network computing device 106 establishes an environment 500 during operation. The illustrative environment 500 includes a network communication management module 510, a NUMA node management module 520, a multi-home NIC management module 530, a control path management module 540, and a control path determination module 550. The various modules of the environment 500 may be embodied as hardware, firmware, software, or a combination thereof. As such, in some embodiments, one or more of the modules of the environment 500 may be embodied as circuitry or collection of electrical devices (e.g., a network communication management circuit 510, a NUMA node management circuit 520, a multi-home NIC management circuit 530, a control path management circuit 540, a control path determination circuit 550, etc.).

It should be appreciated that, in such embodiments, one or more of the network communication management circuit 510, the NUMA node management circuit 520, the multi-home NIC management circuit 530, the control path management circuit 540, and the control path determination circuit 550 may form a portion of one or more of one or more processors (e.g., processor (1) 202 and processor (2) 208 of FIG. 2), the I/O subsystem 214, the multi-home NIC 222, and/or other hardware components of the network computing device 106. Additionally, in some embodiments, one or more of the illustrative modules may form a portion of another module and/or one or more of the illustrative modules may be independent of one another. Further, in some embodiments, one or more of the modules of the environment 500 may be embodied as virtualized hardware components or emulated architecture, which may be established and maintained by the one or more processors or other components of the network computing device 106.

In the illustrative environment 500, the network computing device 106 further includes NUMA node map data 502, queue map data 504, and queue data 506, each of which may be stored in the memory 216 and/or the data storage device 218 of the network computing device 106. Further, one or more of the NUMA node map data 502, the queue map data 504, and the queue data 506 may be accessed by the various modules and/or sub-modules of the network computing device 106. It should be appreciated that the network computing device 106 may include additional and/or alternative components, sub-components, modules, sub-modules, and/or devices commonly found in a computing device, which are not illustrated in FIG. 5 for clarity of the description.

The network communication management module 510, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the network computing device 106. To facilitate the inbound and outbound network communications, the network communication management module 510 is configured to receive and process network packets from other computing devices (e.g., the source endpoint node 102, the destination endpoint node 108, another network computing device communicatively coupled to the network computing device 106 via the network 104, etc.). Additionally, the network communication management module 510 is configured to prepare and transmit network packets to another computing device (e.g., the source endpoint node 102, the destination endpoint node 108, another network computing device communicatively coupled to the network computing device 106 via the network 104, etc.). Accordingly, in some embodiments, at least a portion of the functionality of the network communication management module 510 may be performed by the communication circuitry 220, and more specifically by the multi-home NIC 222.

The NUMA node management module 520, which may be embodied as hardware, firmware, software, virtualized hardware, emulated architecture, and/or a combination thereof, as discussed above, is configured to manage the NUMA nodes 320 (e.g., NUMA node (1) 322 and NUMA node (2) 326). As previously described above with regard to the illustrative NUMA nodes 320 of FIG. 3, each of the NUMA nodes 320 includes a portion of allocated memory (e.g., local memory) that is directly linked to a particular one of the NUMA nodes 320. Additionally, each of the NUMA nodes 320 includes an allocated number of processor cores.

It should be appreciated that each set of allocated processor cores assigned to a respective one of the NUMA nodes 320 may be referred to as socket cores. In other words, the number of allocated cores of a physical processor package may be referred to as a socket. Accordingly, the NUMA node management module 520 is configured to manage the allocated portions of local memory and processor cores for each of the NUMA nodes 320. Additionally, it should be appreciated that, in some embodiments, the number of allocated processor cores may be referred to as a socket. For example, as noted previously, the processor cores of a physical processor package (e.g., the processor cores 204 of the processor (1) 202) may be allocated to more than one NUMA node 320. Accordingly, in such embodiments, to distinguish the allocated processor cores across the multiple NUMA nodes 320, each set of allocated processor cores of the physical processor package may be referred to as a socket.

As such, to manage the NUMA nodes 320, the illustrative NUMA node management module 520 includes a processor core management module 522 configured to manage the allocation of processor cores for each of the NUMA nodes 320 and a local memory management module 524 configured to manage the allocation of local memories for each of the NUMA nodes 320. It should be appreciated that each of the processor core management module 522 and the local memory management module 524 of the NUMA node management module 520 may be separately embodied as hardware, firmware, software, virtualized hardware, emulated architecture, and/or a combination thereof. For example, the processor core management module 522 may be embodied as a hardware component, while the local memory management module 524 are embodied as a virtualized hardware component or as some other combination of hardware, firmware, software, virtualized hardware, emulated architecture, and/or a combination thereof.

The multi-home NIC management module 530, which may be embodied as hardware, firmware, software, virtualized hardware, emulated architecture, and/or a combination thereof, as discussed above, is configured to manage the logical functions of the multi-home NIC 222. To age the logical functions of the multi-home NIC 222, the multi-home NIC management module 530 includes a logical NIC management module 532 and a logical switch management module 534. It should be appreciated that each of the logical NIC management module 532 and the logical switch management module 534 of the multi-home NIC management module 530 may be separately embodied as hardware, firmware, software, virtualized hardware, emulated architecture, and/or a combination thereof. For example, the logical NIC management module 532 may be embodied as a hardware component, while the logical switch management module 534 are embodied as a virtualized hardware component or as some other combination of hardware, firmware, software, virtualized hardware, emulated architecture, and/or a combination thereof.

The logical NIC management module 532 is configured to manage the instantiation and provisioning of the each of the logical NICs (e.g., the logical NIC (1) and the logical NIC (2) of FIG. 3). Additionally, the logical NIC management module 532 is configured to manage resource allocation for each of the logical NICs, as well as allocate and update (e.g., enqueue/dequeuer, push/pop, etc.) the queues of each of the logical NICs (e.g., the queues 308 of the logical NIC (1) and the queues 312 of the logical NIC (2) of FIG. 3). As described previously, the queues may include one or more work queues, network packet processing queues, network packet transmission queues, and/or any other type of queue usable by the corresponding logical NIC to receive, process, and/or forward network traffic. In some embodiments, the queue and/or data related to thereto (e.g., head/tail indicators, queue size indicators, queue element information, address indicators, etc.) may be stored in the queue data 506.

The logical switch management module 534 is configured to manage the instantiation and provisioning of the logical switch (e.g., the logical switch 304 of FIG. 3). Additionally, the logical switch management module 534 is configured to manage resource allocation for the logical switch, as well as perform the tasks associated with the logical switch as described herein. For example, as described in the method 700 of FIG. 7 below, the logical switch management module 534 is configured to manage the receipt of network packets from the logical NICs and the forwarding of the network packets to a target computing device via an uplink port (e.g., the uplink port 302). In another example, as described in the method 600 of FIG. 6 below, the logical switch management module 534 is configured to manage the receipt of network packets from the uplink port (e.g., received from an external computing device), determine which logical NIC to queue the network packet, and enqueue the network packet, or at least a portion thereof, in a queue of the determined logical NIC.

The control path management module 540, which may be embodied as hardware, firmware, software, virtualized hardware, emulated architecture, and/or a combination thereof, as discussed above, is configured to manage the control path for each of the received/generated network packets. Each control path may be determined based on a logical NIC (e.g., an identifier of the logical NIC, a queue of the logical NIC, etc.) directly coupled to a NUMA node assigned to process (e.g., perform a function/service) the network packet, the NUMA node that is to execute the process, and/or a memory (e.g., a block of memory addresses) that includes stored information usable to process the network packet that has been allocated to or is otherwise directly connected (e.g., a local memory) to the NUMA node.

As described previously, the control path may be a locally homed control path or a remotely homed control path. As also described previously, the preferred control path is the locally homed control path, which may be determined, or followed if the control path has already been created, by a logical switch (e.g., the logical switch 304 of FIG. 3). Accordingly, the control path management module 540 is configured to identify the applicable locally homed control path for each of the received network packets to be processed. To identify the applicable locally homed control path, the illustrative control path management module 540 includes a NUMA node map management module 542 and a queue map management module 544.

It should be appreciated that each of the NUMA node map management module 542 and the queue map management module 544 of the control path management module 540 may be separately embodied as hardware, firmware, software, virtualized hardware, emulated architecture, and/or a combination thereof. For example, the NUMA node map management module 542 may be embodied as a hardware component, while the queue map management module 544 are embodied as a virtualized hardware component or as some other combination of hardware, firmware, software, virtualized hardware, emulated architecture, and/or a combination thereof.

The NUMA node map management module 542 is configured to manage or otherwise maintain a NUMA node map. The NUMA node map is usable by the network computing device 106 (e.g., the control path determination module 550) to determine which NUMA node, or which NUMA node that includes the NUMA node, the network packet or work related thereto is to be transmitted to for processing. Accordingly, in some embodiments, the NUMA node map may be embodied as a lookup table, such as a hash table that includes key/value pairs associating NUMA nodes (e.g., the processor cores and/or the local memory thereof) with identifying information and/or characteristics of the network packet (e.g., a source internet protocol (IP) address, a destination IP address, a source media access control (MAC) address, a destination MAC address, a tuple flow identification, a workload type, etc.). In some embodiments, the NUMA node map and/or other applicable data related thereto may be stored in the NUMA node map data 502.

The queue map management module 544 is configured to manage or otherwise maintain a queue map. The queue map is usable by the network computing device 106 (e.g., the control path determination module 550) to determine which queue of a logical NIC the network packet is to be transmitted to for receiving/transmitting. Accordingly, in some embodiments, similar to the NUMA node map, the queue map may be embodied as a lookup table, such as a hash table that includes key/value pairs associating queues with identifying information of the network packet. In some embodiments, the queue map and/or other applicable data related thereto may be stored in the queue map data 504.

The control path determination module 550, which may be embodied as hardware, firmware, software, virtualized hardware, emulated architecture, and/or a combination thereof, as discussed above, is configured to determine a control path for a received network packet. As described previously, the network computing device 106 can identify a locally homed control path or a remotely homed control path for a received network packet. Accordingly, the control path determination module 550 is configured to identify the appropriate control path.

To identify the appropriate control path, the illustrative control path determination module 550 includes a NUMA node determination module 552 configured to determine a NUMA node for which a received network packet is to be transmitted to for processing and a queue determination module 554 configured to determine a queue of a logical NIC for which a network packet, or an applicable portion thereof, is to be queued. It should be appreciated that each of the NUMA node determination module 552 and the queue determination module 554 of the control path determination module 550 may be separately embodied as hardware, firmware, software, virtualized hardware, emulated architecture, and/or a combination thereof. For example, the NUMA node determination module 552 may be embodied as a hardware component, while the queue determination module 554 are embodied as a virtualized hardware component or as some other combination of hardware, firmware, software, virtualized hardware, emulated architecture, and/or a combination thereof.

In some embodiments, the control path determination module 550 may be configured to classify the received network packet, such as by identifying information and/or characteristics of the network packet (e.g., a workload type, a source internet protocol (IP) address, a destination IP address, a source media access control (MAC) address, a destination MAC address, a tuple flow identification, etc.). Accordingly, in such embodiments, the control path determination module 550 (e.g., the NUMA node determination module 552 and/or the queue determination module 554) can determine the control path based on the determined classification.

It should be appreciated that, in some embodiments, a received network packet may not be identifiable, or otherwise classifiable. For example, an embodiment wherein the network packet represents an initial network packet of a flow as of yet identified by the network computing device 106 may result in the initial network packet not being identifiable, or otherwise classifiable. In such embodiments, the control path determination module 550 may be configured to apply a hash to at least a portion of the network packet identifying information. Accordingly, a result of the hash may be used to direct the network packet to a logical NIC (e.g., a queue of the logical NIC). Additionally, the network computing device 106 may be configured to temporarily map the network packet (e.g., via the control path management module 540) to a logical NIC and/or NUMA node (e.g., a particular process core and/or local memory of the NUMA node) until a determination can be made of the appropriate locally homed control path.

Figure 6:
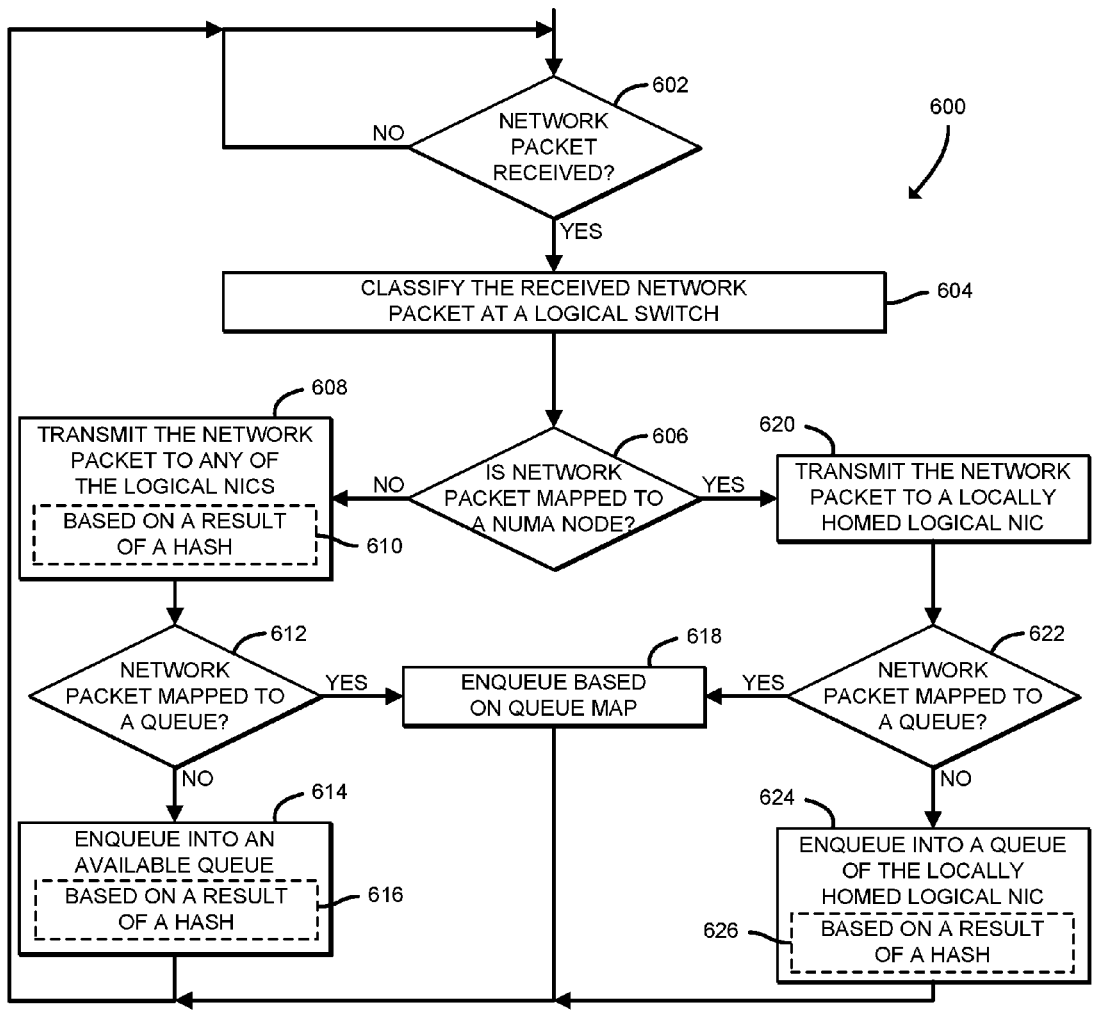
FIG. 6 is a simplified flow diagram of at least one embodiment of a method for accelerating non-uniform network I/O accesses upon receiving a network packet that may be executed by the network computing device of FIG. 2.

Referring now to FIG. 6, in use, the network computing device 106 may execute a method 600 for accelerating non-uniform network I/O accesses upon receiving a network packet at a multi-home NIC (e.g., the multi-home NIC 222 of FIG. 2) of the network computing device 106. The method 600 begins in block 602, in which the network computing device 106 determines whether a network packet (e.g., an inbound network packet) has been received at the multi-home NIC 222 from a remote computing device, such as the source endpoint node 102, the destination endpoint node 108, or another network computing device 106. As described previously, the network computing device 106 is configured to receive network traffic from external sources at the uplink port 302 of the multi-home NIC 222. The uplink port 302 is further configured to transmit the received network packet to the logical switch 304 for further evaluation and transmission to a logical NIC. Accordingly, if a network packet has been received by the uplink port and transmitted to the logical switch 304, the method 600 advances to block 604, in which the network computing device 106 (e.g., the logical switch 304) classifies the received network packet at the logical switch 304 of the network computing device 106.

As described previously, the received network packet may be classified based on identifying information of the network packet, such as one or more of a source internet protocol (IP) address, a destination IP address, a source media access control (MAC) address, a destination MAC address, a tuple flow identification, and the like. Additionally or alternatively, in some embodiments, the received network packet may be classified based on a characteristic, or expected characteristic, of the network packet, such as a workload type, an expected processor usage, an expected memory usage, etc. In an illustrative example, in such embodiments wherein the network traffic is tunneled or virtual machine (VM) network traffic, the logical switch 304 may use an IP address, a MAC address, a virtual network interface identifier, and/or container identifier to identify the appropriate NUMA node. It should be appreciated that, in some embodiments, the logical switch 304 may coordinate the identification of the appropriate NUMA node with a hypervisor or operating system scheduler of the network computing device 106.

In another illustrative example, in such embodiments wherein the network traffic is non-tunneled, the logical switch 304 may use a queue number (e.g., as embedded in a protocol, such as RDMA) to identify the appropriate NUMA node (e.g., the applicable processor cores and/or local memory) and/or any flow identifying information load balanced across the queues of the logical NICs. In other words, the identifier may be mapped to a queue, the elements of which are allocation and NUMA aware. Accordingly, it should be appreciated that the identification of the appropriate NUMA node (e.g., that includes the locally homed logical NIC) may be learned or explicitly/implicitly programmed into the multi-home NIC 222, and existing NIC load balancing techniques may be used to select a specific processor core within the identified NUMA node thereafter.

In block 606, the network computing device 106 determines whether the received network packet is mapped to a NUMA node in a mapping table (e.g., a NUMA node map), or lookup table. As described previously, a logical NIC is termed a locally homed logical NIC relative to a particular NUMA node (e.g., one of the NUMA nodes 320). In other words, every logical NIC is a locally homed logical NIC to a particular one of the NUMA nodes. Further, each locally homed logical NIC is termed a remotely homed logical NIC relative to all the other NUMA nodes, which are not directly linked to the locally homed logical NIC. Accordingly, in block 606, the network computing device 106 is determining whether the received network packet is mapped to a NUMA node to determine a locally homed logical NIC relative to the mapped NUMA node. In some embodiments, to determine whether the received network packet is mapped to a NUMA node, the network computing device 106 may make the determination based on a lookup of the NUMA node map using a result of the classification performed in block 604.

If the network computing device 106 determines the received network packet is not mapped to a NUMA node (e.g., an entry corresponding to the network packet is not in the NUMA node map) in block 606, the method 600 branches to block 608; otherwise, the method 600 branches to block 616, which is described below. In block 608, the network computing device 106 (e.g., the logical switch 304 of the multi-home NIC 222) transmits the network packet to any of the logical NICs of the multi-home NIC 222. To do so, in some embodiments, the network computing device 106 may apply a hash function to at least a portion of the network packet (e.g., identifying information retrievable from a header of the network packet and/or a payload of the network packet) and use the result of the applied hash to determine which logical NIC to transmit the network packet to. Additionally or alternatively, in some embodiments, the network computing device may determine a characteristic, or expected characteristic, of the network packet (e.g., a workload type, an expected processor usage, an expected memory usage, a service type, etc.) and use the determined network packet characteristic to determine which logical NIC to transmit the network packet to.

From block 608, the method 600 continues to block 612, in which the network computing device 106 determines whether the network packet is mapped to a queue of the logical NIC to which the network packet was transmitted to in block 608. If not, the method 600 branches to block 614, in which the network computing device 106 enqueues at least a portion of the network packet into an available queue of the logical NIC to which the network packet was transmitted to in block 608. To do so, in some embodiments, in block 616, the network computing device 106 may determine a queue of the logical NIC in which to enqueue at least a portion of the network packet based on a result of an applied hash. Otherwise, if the network computing device 106 determines the network packet is mapped to a queue of the logical NIC, the method 600 branches to block 618, in which the network computing device 106 enqueues at least a portion of the network packet into a mapped queue of the logical NIC.

Referring again to block 606, as described previously, if the network computing device 106 determines the received network packet is mapped to a NUMA node (e.g., a particular processor core/local memory), the method 600 branches to block 620. In block 620, the network computing device 106 (e.g., the logical switch 304 of the multi-home NIC 222) transmits the network packet to a locally homed logical NIC based on the NUMA node map. As described previously, the NUMA node map is usable by the network computing device 106 to determine which NUMA node that includes the applicable processor cores and/or local memory, the network packet is to be transmitted to and processed thereby. As also described previously, the NUMA node map may be embodied as a lookup table, such as a hash table that includes key/value pairs associating NUMA nodes with identifying information and/or characteristics of the network packet, such as a source internet protocol (IP) address, a destination IP address, a source media access control (MAC) address, a destination MAC address, a tuple flow identification, a workload type, etc.

In block 622, the network computing device 106 determines whether the network packet is mapped to a queue of the locally homed logical NIC. If not, the method 600 branches to block 624, in which the network computing device 106 enqueues at least a portion of the network packet into a queue of the locally homed logical NIC. To do so, in some embodiments, in block 626, the network computing device 106 may determine a queue of the locally homed logical NIC in which to enqueue at least a portion of the network packet based on a result of an applied hash. Otherwise, if the network computing device 106 determines the network packet is mapped to a queue of the locally homed logical NIC, the method 600 branches to block 618, in which the network computing device 106 enqueues at least a portion of the network packet into a mapped queue of the locally homed logical NIC based on the queue map.

Figure 7:
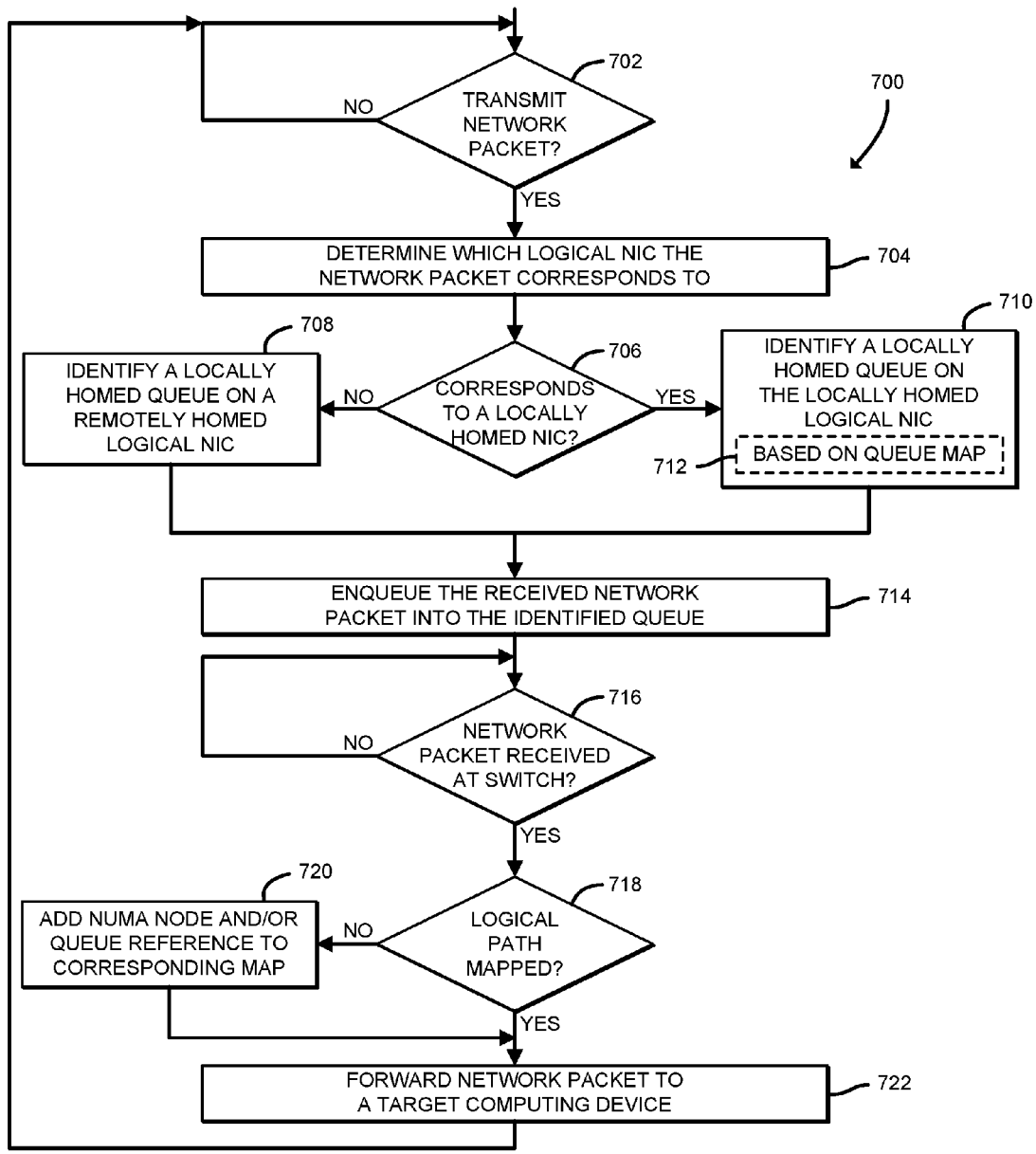
FIG. 7 is a simplified flow diagram of at least one embodiment of a method for accelerating non-uniform network I/O accesses on transmission of a network packet that may be executed by the network computing device of FIG. 2.

Referring now to FIG. 7, in use, the network computing device 106 may execute a method 700 for accelerating non-uniform network I/O accesses for transmission of a network packet from a multi-home NIC (e.g., the multi-home NIC 222) of the network computing device 106. The method 700 begins in block 702, in which the network computing device 106 determines whether a network packet (e.g., an outbound network packet) has been received by (e.g., from a NUMA node) or generated by the multi-home NIC 222. If the network computing device 106 determines that a network packet has been received by the multi-home NIC 222 from a NUMA node, the method 700 advances to block 704 in which the multi-home NIC 222 determines which logical NIC the network corresponds to.

In block 706, the multi-home NIC 222 determines whether the logical NIC determined in block 704 corresponds to a locally homed logical NIC, as opposed to a remotely homed logical NIC. In other words, the logical NIC directly linked to the NUMA node (e.g., the physical process package that includes the corresponding allocated processor cores) from which the network packet was received in block 702 may not be the logical NIC intended to queue the network packet, such as when the queue has not yet been mapped. Accordingly, in such embodiments, the logical NIC having received the network packet may be a remotely homed logical NIC having a locally homed queue. As such, if the multi-home NIC 222 determines the logical NIC determined in block 704 does not correspond to a locally homed logical NIC, the method 700 branches to block 708, in which the multi-home NIC 222 identifies a locally homed queue on the remotely homed logical NIC. Subsequently, in block 714, the multi-home NIC 222 enqueues the received network packet into the queue identified in block 708.

However, if the multi-home NIC 222 determines the logical NIC determined in block 704 does correspond to a locally homed logical NIC, the method 700 branches to block 710, in which the multi-home NIC 222 identifies a locally homed queue on the locally homed logical NIC. To do so, in some embodiments, in block 712 the multi-home NIC 222 may identify the locally homed queue based on a result of a lookup performed on a queue map. As described previously, the queue map is usable by the network computing device 106 to determine which queue of a logical NIC the network packet is to be transmitted to for forwarding. As also described previously, the queue map may be embodied as a lookup table, such as a hash table that includes key/value pairs associating queues with identifying information and/or characteristics of the network packet (e.g., a source internet protocol (IP) address, a destination IP address, a source media access control (MAC) address, a destination MAC address, a tuple flow identification, a workload type, etc.). Subsequently, in block 714, the multi-home NIC 222 enqueues the received network packet into the queue identified in block 710.

In block 716, the multi-home NIC 222 (e.g., the logical switch 304) determines whether the network packet has been received by the logical switch 304 (e.g., dequeued from the appropriate queue and transmitted to the logical switch 304). If so, the method 700 advances to block 718, in which the multi-home NIC 222 determines whether a logical path of the network packet has been mapped. In other words, the multi-home NIC 222 determines whether a locally homed logical NIC, a locally homed queue, and/or a preferred NUMA node (e.g., preferred processor core/local memory) have been mapped to the appropriate map (e.g., the queue map and/or the NUMA node map). If so, the method 700 advances to block 722 in which the multi-home NIC 222 forwards the network packet to a target computing device (e.g., the source endpoint node 102, the destination endpoint node 108, another network computing device 106, etc.) before returning to block 702 to determine whether another network packet has been received for transmission. Otherwise, if the multi-home NIC 222 determines a logical path of the network packet has not been mapped, the method 700 branches to block 720, in which the multi-home NIC 222 adds a NUMA node/queue reference (e.g., an identifier of the network packet and an identifier of the NUMA node and/or logical NIC queue) to the corresponding map before advancing to block 722.

It should be appreciated that at least a portion of one or both of the methods 600 and 700 may be executed by the multi-home NIC 222 of the network computing device 106. It should be further appreciated that, in some embodiments, one or both of the methods 600 and 700 may be embodied as various instructions stored on a computer-readable media, which may be executed by a processor (e.g., the processor 202, the processor 208, etc.), the multi-home NIC 222, and/or other components of the network computing device 106 to cause the network computing device 106 to perform the methods 600 and 700. The computer-readable media may be embodied as any type of media capable of being read by the network computing device 106 including, but not limited to, the memory 216, the data storage device 218, a secure memory (not shown) of the multi-home NIC 222, other memory or data storage devices of the network computing device 106, portable media readable by a peripheral device of the network computing device 106, and/or other media.

EXAMPLES

Illustrative examples of the technologies disclosed herein are provided below. An embodiment of the technologies may include any one or more, and any combination of, the examples described below.

Example 1 includes a network computing device for non-uniform network input/output access acceleration, the network computing device comprising a plurality of non-uniform memory access (NUMA) nodes, wherein each of the NUMA nodes includes an allocated number of processor cores of a corresponding physical processor package and a local memory, wherein the local memory defines a portion of the main memory allocated to and directly linked to a respective one of the NUMA nodes; and a multi-home network interface controller (NIC) to facilitate ingress and egress of network packets, wherein the multi-home NIC includes a logical switch communicatively coupled to a plurality of logical NICs, wherein each of the plurality of logical NICs includes one or more queues to store at least a portion of the network packets received by the multi-home NIC, and wherein each of the plurality of logical NICs is directly linked to a respective one of the NUMA nodes.

Example 2 includes the subject matter of Example 1, and wherein to facilitate the ingress and egress of the network packets comprises to (i) receive a network packet from a remote computing device at the logical switch, (ii) determine one of the NUMA nodes to transfer the network packet to for processing of the network packet, (iii) enqueue at least a portion of the network packet into a queue of a logical NIC of the plurality of logical NICs directly linked to the determined one of the NUMA nodes, and (iv) transmit the at least a portion of the network packet from the queue of the logical NIC to the determined one of the NUMA nodes.

Example 3 includes the subject matter of any of Examples 1 and 2, and wherein to facilitate the ingress and egress of the network packets through the multi-home NIC comprises to (i) receive an outbound network packet for transmission to a target computing device from one of the plurality of NUMA nodes, (ii) determine a logical NIC of the plurality of logical NICs to which the outbound network packet corresponds, (iii) enqueue the outbound network packet into a queue of one of the plurality of logical NICs, and (iv) forward the outbound network packet to the target computing device based on an identifier of the target computing device.

Example 4 includes the subject matter of any of Examples 1-3, and wherein to enqueue the received network packet into the queue of one of the plurality of logical NICs comprises to (i) determine whether the determined logical NIC corresponds to a locally homed logical NIC of the plurality of logical NICs, wherein the locally homed logical NIC comprises one of the plurality of logical NICs directly connected to the one of the plurality of NUMA nodes at which the network packet has been received, (ii) identify, in response to a determination that the determined logical NIC corresponds to the locally homed logical NIC, a locally homed queue of the locally homed logical NIC, and (iii) enqueue the received network packet into the locally homed queue of the locally homed logical NIC.

Example 5 includes the subject matter of any of Examples 1-4, and wherein to identify the locally homed queue of the locally homed logical NIC comprises to identify the locally homed queue of the locally homed logical NIC based on a queue map, wherein the queue map identifies a relationship between the network packet and the locally homed queue of the locally homed logical NIC.

Example 6 includes the subject matter of any of Examples 1-5, and wherein to enqueue the received network packet into the queue of one of the plurality of logical NICs further comprises to (i) identify, in response to a determination that the determined logical NIC does not correspond to the locally homed logical NIC, a locally homed queue of a remotely homed logical NIC of the plurality of logical NICs, wherein the remotely homed logical NIC comprises one of the plurality of logical NICs that is not directly connected to the one of the plurality of NUMA nodes at which the network packet has been received, and (iii) enqueue the received network packet into the locally homed queue of a remotely homed NIC.

Example 7 includes the subject matter of any of Examples 1-6, and wherein to determine the one of the NUMA nodes comprises to (i) classify the network packet based on at least one of an identifier of the network packet or a characteristic of the network packet and (ii) determine the one of the NUMA nodes based on the classification of the network packet.

Example 8 includes the subject matter of any of Examples 1-7, and wherein to determine the one of the NUMA nodes based on the classification comprises to compare a result of the classification to a NUMA node map, wherein the NUMA node map identifies a relationship between the network packet and the one of the NUMA nodes.

Example 9 includes the subject matter of any of Examples 1-8, and wherein the identifier of the network packet includes at least one of a source internet protocol (IP) address, a destination IP address, a source media access control (MAC) address, a destination MAC address, or a tuple flow identification.

Example 10 includes the subject matter of any of Examples 1-9, and wherein the characteristic of the network packet includes at least one of a workload type, an expected processor usage, or an expected memory usage.

Example 11 includes the subject matter of any of Examples 1-10, and wherein to determine the one of the NUMA nodes comprises to (i) apply a hash to at least a portion of the network packet and (ii) determine the one of the NUMA nodes based on a result of the applied hash.

Example 12 includes a network computing device for non-uniform network input/output access acceleration, the network computing device comprising a multi-home network interface controller (NIC) management module to receive a network packet from a remote computing device at a logical switch of a multi-home NIC of the network computing device; and a control path determination module to (i) determine one of a plurality of non-uniform memory access (NUMA) nodes of the network computing device, wherein the one of the NUMA nodes comprises a plurality of processor cores of a physical processor package allocated to the NUMA node usable to process the received network packet and (ii) determine a logical NIC from a plurality of logical NICs based on which of the plurality of logical NICs is directly coupled to the determined one of the NUMA nodes, wherein each of the plurality of logical NICs is coupled to the logical switch.

Example 13 includes the subject matter of Example 12, and wherein the NIC management module is further to (i) transmit the network packet to the logical NIC, (ii) enqueue at least a portion of the network packet into a queue of one or more queues of the logical NIC directly linked to the determined one of the NUMA nodes, and (iii) transmit the at least a portion of the network packet from the queue of the logical NIC to the determined one of the NUMA nodes.

Example 14 includes the subject matter of any of Examples 12 and 13, and wherein the multi-home NIC management module is further to (i) receive an outbound network packet for transmission to a target computing device from one of the plurality of NUMA nodes, (ii) determine a logical NIC of the plurality of logical NICs to which the outbound network packet corresponds, (iii) enqueue the outbound network packet into a queue of one of the plurality of logical NICs, and (iv) forward the outbound network packet to the target computing device based on an identifier of the target computing device.

Example 15 includes the subject matter of any of Examples 12-14, and wherein to enqueue the received network packet into the queue of one of the plurality of logical NICs comprises to (i) determine whether the determined logical NIC corresponds to a locally homed logical NIC of the plurality of logical NICs, wherein the locally homed logical NIC comprises one of the plurality of logical NICs directly connected to the one of the plurality of NUMA nodes at which the network packet has been received, (ii) identify, in response to a determination that the determined logical NIC corresponds to the locally homed logical NIC, a locally homed queue of the locally homed logical NIC, and (iii) enqueue the received network packet into the locally homed queue of the locally homed logical NIC.

Example 16 includes the subject matter of any of Examples 12-15, and wherein to identify the locally homed queue of the locally homed logical NIC comprises to identify the locally homed queue of the locally homed logical NIC based on a queue map, wherein the queue map identifies a relationship between the network packet and the locally homed queue of the locally homed logical NIC.

Example 17 includes the subject matter of any of Examples 12-16, and wherein to enqueue the received network packet into the queue of one of the plurality of logical NICs further comprises to (i) identify, in response to a determination that the determined logical NIC does not correspond to the locally homed logical NIC, a locally homed queue of a remotely homed logical NIC of the plurality of logical NICs, wherein the remotely homed logical NIC comprises one of the plurality of logical NICs that is not directly connected to the one of the plurality of NUMA nodes at which the network packet has been received, and (iii) enqueue the received network packet into the locally homed queue of a remotely homed NIC.

Example 18 includes the subject matter of any of Examples 12-17, and wherein to determine the one of the NUMA nodes comprises to (i) classify the network packet based on at least one of an identifier of the network packet or a characteristic of the network packet and (ii) determine the one of the NUMA nodes based on the classification of the network packet.

Example 19 includes the subject matter of any of Examples 12-18, and wherein to determine the one of the NUMA nodes based on the classification comprises to compare a result of the classification to a NUMA node map, wherein the NUMA node map identifies a relationship between the network packet and the one of the NUMA nodes.

Example 20 includes the subject matter of any of Examples 12-19, and wherein the identifier of the network packet includes at least one of a source internet protocol (IP) address, a destination IP address, a source media access control (MAC) address, a destination MAC address, or a tuple flow identification.

Example 21 includes the subject matter of any of Examples 12-20, and wherein the characteristic of the network packet includes at least one of a workload type, an expected processor usage, or an expected memory usage.

Example 22 includes the subject matter of any of Examples 12-21, and wherein to determine the one of the NUMA nodes comprises to (i) apply a hash to at least a portion of the network packet and (ii) determine the one of the NUMA nodes based on a result of the applied hash.

Example 23 includes a method for accelerating non-uniform network input/output accesses, the method comprising receiving, by a logical switch of a multi-home network interface controller (NIC) of a network computing device, a network packet from a remote computing device; determining, by the logical switch, one of a plurality of non-uniform memory access (NUMA) nodes of the network computing device, wherein the one of the NUMA nodes comprises a plurality of processor cores of a physical processor package allocated to the NUMA node usable to process the received network packet; determining, by the logical switch, a logical NIC from a plurality of logical NICs coupled to the logical switch, based on which of the plurality of logical NICs is directly coupled to the determined one of the NUMA nodes; transmitting, by the logical switch, the network packet to the logical NIC; enqueuing, by the logical NIC, at least a portion of the network packet into a queue of one or more queues of the logical NIC directly linked to the determined one of the NUMA nodes; and transmitting, by the logical NIC, the at least a portion of the network packet from the queue of the logical NIC to the determined one of the NUMA nodes.

Example 24 includes the subject matter of Example 23, and wherein determining the one of the NUMA nodes comprises (i) classifying the network packet based on at least one of an identifier of the network packet or a characteristic of the network packet and (ii) determining the one of the NUMA nodes based on the classification of the network packet.

Example 25 includes the subject matter of any of Examples 23 and 24, and wherein determining the one of the NUMA nodes based on the classification comprises comparing a result of the classification to a NUMA node map, wherein the NUMA node map identifies a relationship between the network packet and the one of the NUMA nodes.

Example 26 includes the subject matter of any of Examples 23-25, and wherein classifying the network packet based on the identifier of the network packet comprises classifying the network packet based on at least one of a source internet protocol (IP) address, a destination IP address, a source media access control (MAC) address, a destination MAC address, or a tuple flow identification.

Example 27 includes the subject matter of any of Examples 23-26, and wherein classifying the network packet based on the characteristic of the network packet comprises classifying the network packet based on at least one of a workload type, an expected processor usage, or an expected memory usage.

Example 28 includes the subject matter of any of Examples 23-27, and wherein determining the one of the NUMA nodes comprises (i) applying a hash to at least a portion of the network packet and (ii) determining the one of the NUMA nodes based on a result of the applied hash.

Example 29 includes the subject matter of any of Examples 23-28, and further comprising receiving an outbound network packet for transmission to a target computing device from one of the plurality of NUMA nodes; determining a logical NIC of the plurality of logical NICs to which the outbound network packet corresponds; enqueuing the outbound network packet into a queue of one of the plurality of logical NICs; and forwarding the outbound network packet to the target computing device based on an identifier of the target computing device.

Example 30 includes the subject matter of any of Examples 23-29, and wherein enqueuing the received network packet into the queue of one of the plurality of logical NICs comprises determining whether the determined logical NIC corresponds to a locally homed logical NIC of the plurality of logical NICs, wherein the locally homed logical NIC comprises one of the plurality of logical NICs directly connected to the one of the plurality of NUMA nodes at which the network packet has been received; identifying, in response to a determination that the determined logical NIC corresponds to the locally homed logical NIC, a locally homed queue of the locally homed logical NIC; and enqueuing the received network packet into the locally homed queue of the locally homed logical NIC.

Example 31 includes the subject matter of any of Examples 23-30, and wherein identifying the locally homed queue of the locally homed logical NIC comprises identifying the locally homed queue of the locally homed logical NIC based on a queue map, wherein the queue map identifies a relationship between the network packet and the locally homed queue of the locally homed logical NIC.

Example 32 includes the subject matter of any of Examples 23-31, and wherein enqueuing the received network packet into the queue of one of the plurality of logical NICs further comprises identifying, in response to a determination that the determined logical NIC does not correspond to the locally homed logical NIC, a locally homed queue of a remotely homed logical NIC of the plurality of logical NICs, wherein the remotely homed logical NIC comprises one of the plurality of logical NICs that is not directly connected to the one of the plurality of NUMA nodes at which the network packet has been received; and enqueuing the received network packet into the locally homed queue of a remotely homed NIC.

Example 33 includes a network computing device comprising a processor; and a memory having stored therein a plurality of instructions that when executed by the processor cause the network computing device to perform the method of any of claims 23-32.

Example 34 includes one or more machine readable storage media comprising a plurality of instructions stored thereon that in response to being executed result in a network computing device performing the method of any of claims 23-32.

Example 35 includes a network computing device for non-uniform network input/output access acceleration, the network computing device comprising means for receiving, by a logical switch of a multi-home network interface controller (NIC) of the network computing device, a network packet from a remote computing device; means for determining, by the logical switch, one of a plurality of non-uniform memory access (NUMA) nodes of the network computing device, wherein each of the NUMA nodes includes a plurality of processor cores of a physical processor package allocated to the NUMA node usable to process the received network packet; means for determining, by the logical switch, a logical NIC from a plurality of logical NICs coupled to the logical switch, based on which of the plurality of logical NICs is directly coupled to the determined one of the NUMA nodes; means for transmitting, by the logical switch, the network packet to the logical NIC; means for enqueuing, by the logical NIC, at least a portion of the network packet into a queue of one or more queues of the logical NIC directly linked to the determined one of the NUMA nodes; and means for transmitting, by the logical NIC, the at least a portion of the network packet from the queue of the logical NIC to the determined one of the NUMA nodes.

Example 36 includes the subject matter of Example 35, and wherein the means for determining the one of the NUMA nodes comprises means for (i) classifying the network packet based on at least one of an identifier of the network packet or a characteristic of the network packet and (ii) determining the one of the NUMA nodes based on the classification of the network packet.

Example 37 includes the subject matter of any of Examples 35 and 36, and wherein the means for determining the one of the NUMA nodes based on the classification comprises means for comparing a result of the classification to a NUMA node map, wherein the NUMA node map identifies a relationship between the network packet and the one of the NUMA nodes.

Example 38 includes the subject matter of any of Examples 35-37, and wherein the means for classifying the network packet based on the identifier of the network packet comprises means for classifying the network packet based on at least one of a source internet protocol (IP) address, a destination IP address, a source media access control (MAC) address, a destination MAC address, or a tuple flow identification.

Example 39 includes the subject matter of any of Examples 35-38, and wherein the means for classifying the network packet based on the characteristic of the network packet comprises means for classifying the network packet based on at least one of a workload type, an expected processor usage, or an expected memory usage.

Example 40 includes the subject matter of any of Examples 35-39, and wherein the means for determining the one of the NUMA nodes comprises means for (i) applying a hash to at least a portion of the network packet and (ii) determining the one of the NUMA nodes based on a result of the applied hash.

Example 41 includes the subject matter of any of Examples 35-40, and further comprising means for receiving an outbound network packet for transmission to a target computing device from one of the plurality of NUMA nodes; means for determining a logical NIC of the plurality of logical NICs to which the outbound network packet corresponds; means for enqueuing the outbound network packet into a queue of one of the plurality of logical NICs; and means for forwarding the outbound network packet to the target computing device based on an identifier of the target computing device.

Example 42 includes the subject matter of any of Examples 35-41, and wherein the means for enqueuing the received network packet into the queue of one of the plurality of logical NICs comprises means for determining whether the determined logical NIC corresponds to a locally homed logical NIC of the plurality of logical NICs, wherein the locally homed logical NIC comprises one of the plurality of logical NICs directly connected to the one of the plurality of NUMA nodes at which the network packet has been received; means for identifying, in response to a determination that the determined logical NIC corresponds to the locally homed logical NIC, a locally homed queue of the locally homed logical NIC; and means for enqueuing the received network packet into the locally homed queue of the locally homed logical NIC.

Example 43 includes the subject matter of any of Examples 35-42, and wherein the means for identifying the locally homed queue of the locally homed logical NIC comprises means for identifying the locally homed queue of the locally homed logical NIC based on a queue map, wherein the queue map identifies a relationship between the network packet and the locally homed queue of the locally homed logical NIC.

Example 44 includes the subject matter of any of Examples 35-43, and wherein the means for enqueuing the received network packet into the queue of one of the plurality of logical NICs further comprises means for identifying, in response to a determination that the determined logical NIC does not correspond to the locally homed logical NIC, a locally homed queue of a remotely homed logical NIC of the plurality of logical NICs, wherein the remotely homed logical NIC comprises one of the plurality of logical NICs that is not directly connected to the one of the plurality of NUMA nodes at which the network packet has been received; and means for enqueuing the received network packet into the locally homed queue of a remotely homed NIC.

The invention claimed is:

1. A network computing device for non-uniform network input/output access acceleration, the network computing device comprising:
   a plurality of non-uniform memory access (NUMA) nodes, wherein each of the NUMA nodes includes an allocated number of processor cores of a physical processor package of the network computing device and a local memory, and wherein the local memory defines a portion of a main memory of the network computing device allocated to a corresponding NUMA node; and
   a multi-home network interface controller (NIC) to facilitate the ingress and egress of network packets via a network interfacing port of the multi-home NIC, wherein the network interfacing port is communicatively coupled to a logical switch of the multi-home NIC that is configured to route the network packets to one of the NUMA nodes via a corresponding one of a plurality of logical NICs that is communicatively coupled to the one of the NUMA nodes, wherein the logical switch is communicatively coupled to each of the plurality of logical NICs, wherein each of the plurality of logical NICs includes one or more queues to store at least a portion of the network packets received by the multi-home NIC, and wherein each of the plurality of logical NICs is directly linked to a respective one of the NUMA nodes.

2. The network computing device of claim 1, wherein to facilitate the ingress and egress of the network packets comprises to (i) receive a network packet from a remote computing device at the logical switch, (ii) determine which one of the NUMA nodes to transfer the network packet to for processing of the network packet, (iii) enqueue at least a portion of the network packet into a queue of a logical NIC of the plurality of logical NICs directly linked to the determined one of the NUMA nodes, and (iv) transmit the at least a portion of the network packet from the queue of the logical NIC to the determined one of the NUMA nodes.

3. The network computing device of claim 1, wherein to facilitate the ingress and egress of the network packets through the multi-home NIC comprises to (i) receive an outbound network packet for transmission to a target computing device from one of the plurality of NUMA nodes, (ii) determine a logical NIC of the plurality of logical NICs to which the outbound network packet corresponds, (iii) enqueue the outbound network packet into a queue of one of the plurality of logical NICs, and (iv) forward the outbound network packet to the target computing device based on an identifier of the target computing device.

4. The network computing device of claim 3, wherein to enqueue the received network packet into the queue of one of the plurality of logical NICs comprises to (i) determine whether the determined logical NIC corresponds to a locally homed logical NIC of the plurality of logical NICs, wherein the locally homed logical NIC comprises one of the plurality of logical NICs directly connected to the one of the plurality of NUMA nodes at which the network packet has been received, (ii) identify, in response to a determination that the determined logical NIC corresponds to the locally homed logical NIC, a locally homed queue of the locally homed logical NIC, and (iii) enqueue the received network packet into the locally homed queue of the locally homed logical NIC.

5. The network computing device of claim 4, wherein to identify the locally homed queue of the locally homed logical NIC comprises to identify the locally homed queue of the locally homed logical NIC based on a queue map, wherein the queue map identifies a relationship between the network packet and the locally homed queue of the locally homed logical NIC.

6. The network computing device of claim 4, wherein to enqueue the received network packet into the queue of one of the plurality of logical NICs further comprises to (i) identify, in response to a determination that the determined logical NIC does not correspond to the locally homed logical NIC, a locally homed queue of a remotely homed logical NIC of the plurality of logical NICs, wherein the remotely homed logical NIC comprises one of the plurality of logical NICs that is not directly connected to the one of the plurality of NUMA nodes at which the network packet has been received, and (iii) enqueue the received network packet into the locally homed queue of a remotely homed NIC.

7. The network computing device of claim 1, wherein to determine the one of the NUMA nodes comprises to (i) classify the network packet based on at least one of an identifier of the network packet or a characteristic of the network packet and (ii) determine the one of the NUMA nodes based on the classification of the network packet.

8. The network computing device of claim 7, wherein to determine the one of the NUMA nodes based on the classification comprises to compare a result of the classification to a NUMA node map, wherein the NUMA node map identifies a relationship between the network packet and the one of the NUMA nodes.

9. The network computing device of claim 7, wherein the identifier of the network packet includes at least one of a source internet protocol (IP) address, a destination IP address, a source media access control (MAC) address, a destination MAC address, or a tuple flow identification.

10. The network computing device of claim 7, wherein the characteristic of the network packet includes at least one of a workload type, an expected processor usage, or an expected memory usage.

11. The network computing device of claim 1, wherein to determine the one of the NUMA nodes comprises to (i) apply a hash to at least a portion of the network packet and (ii) determine the one of the NUMA nodes based on a result of the applied hash.

12. One or more non-transitory, computer-readable storage media comprising a plurality of instructions stored thereon that in response to being executed cause a network computing device to:

receive, at a network interfacing port of the multi-home NIC, a network packet from a remote computing device;

forward, by the network interfacing port, the received network packet to a communicatively coupled logical switch of a multi-home network interface controller (NIC) of the network computing device, wherein the logical switch is communicatively coupled to a plurality of logical NICs of the multi-home NIC, and wherein each of the plurality of logical NICs includes one or more queues to store at least a portion of the received network packet;

determine one of a plurality of non-uniform memory access (NUMA) nodes of the network computing device to process the received network packet, wherein each of the NUMA nodes includes an allocated number of processor cores of a physical processor package of the network computing device and a local memory of the network computing device, wherein the local memory defines an allocated portion of a main memory of the network computing device; and determine a logical NIC from the plurality of logical NICs based on which of the plurality of logical NICs is directly coupled to the determined one of the NUMA nodes.

13. The one or more non-transitory, computer-readable storage media of claim 12, wherein the plurality of instructions further cause the network computing device to (i) transmit the network packet to the logical NIC, (ii) enqueue at least a portion of the network packet into a queue of one or more queues of the logical NIC directly linked to the determined one of the NUMA nodes, and (iii) transmit the at least a portion of the network packet from the queue of the logical NIC to the determined one of the NUMA nodes.

14. The one or more non-transitory, computer-readable storage media of claim 12, wherein the plurality of instructions further cause the network computing device to (i) receive an outbound network packet for transmission to a target computing device from one of the plurality of NUMA nodes, (ii) determine a logical NIC of the plurality of logical NICs to which the outbound network packet corresponds, (iii) enqueue the outbound network packet into a queue of one of the plurality of logical NICs, and (iv) forward the outbound network packet to the target computing device based on an identifier of the target computing device.

15. The one or more non-transitory, computer-readable storage media of claim 14, wherein to enqueue the received network packet into the queue of one of the plurality of logical NICs comprises to (i) determine whether the determined logical NIC corresponds to a locally homed logical NIC of the plurality of logical NICs, wherein the locally homed logical NIC comprises one of the plurality of logical NICs directly connected to the one of the plurality of NUMA nodes at which the network packet has been received, (ii) identify, in response to a determination that the determined logical NIC corresponds to the locally homed logical NIC, a locally homed queue of the locally homed logical NIC, and (iii) enqueue the received network packet into the locally homed queue of the locally homed logical NIC.

16. The one or more non-transitory, computer-readable storage media of claim 15, wherein to identify the locally homed queue of the locally homed logical NIC comprises to identify the locally homed queue of the locally homed logical NIC based on a queue map, wherein the queue map identifies a relationship between the network packet and the locally homed queue of the locally homed logical NIC.

17. The one or more non-transitory, computer-readable storage media of claim 15, wherein to enqueue the received network packet into the queue of one of the plurality of logical NICs further comprises to (i) identify, in response to a determination that the determined logical NIC does not correspond to the locally homed logical NIC, a locally homed queue of a remotely homed logical NIC of the plurality of logical NICs, wherein the remotely homed logical NIC comprises one of the plurality of logical NICs that is not directly connected to the one of the plurality of NUMA nodes at which the network packet has been received, and (iii) enqueue the received network packet into the locally homed queue of a remotely homed NIC.

18. The one or more non-transitory, computer-readable storage media of claim 12, wherein to determine the one of the NUMA nodes comprises to (i) classify the network packet based on at least one of an identifier of the network packet or a characteristic of the network packet and (ii) determine the one of the NUMA nodes based on the classification of the network packet.

19. The one or more non-transitory, computer-readable storage media of claim 18, wherein to determine the one of the NUMA nodes based on the classification comprises to compare a result of the classification to a NUMA node map, wherein the NUMA node map identifies a relationship between the network packet and the one of the NUMA nodes.

20. The one or more non-transitory, computer-readable storage media of claim 18, wherein the identifier of the network packet includes at least one of a source internet protocol (IP) address, a destination IP address, a source media access control (MAC) address, a destination MAC address, or a tuple flow identification.

21. The one or more non-transitory, computer-readable storage media of claim 18, wherein the characteristic of the network packet includes at least one of a workload type, an expected processor usage, or an expected memory usage.

22. The one or more non-transitory, computer-readable storage media of claim 12, wherein to determine the one of the NUMA nodes comprises to (i) apply a hash to at least a portion of the network packet and (ii) determine the one of the NUMA nodes based on a result of the applied hash.

23. A network computing device for non-uniform network input/output access acceleration, the network computing device comprising:

means for receiving, at a network interfacing port of the multi-home NIC, a network packet from a remote computing device;

means for forwarding, by the network interfacing port, the received network packet to a communicatively coupled logical switch of a multi-home network interface controller (NIC) of the network computing device, wherein the logical switch is communicatively coupled to a plurality of logical NICs of the multi-home NIC, and wherein each of the plurality of logical NICs includes one or more queues to store at least a portion of the received network packet;

means for determining one of a plurality of non-uniform memory access (NUMA) nodes of the network computing device to process the received network packet, wherein each of the NUMA nodes includes an allocated number of processor cores of a physical processor package of the network computing device and a local memory of the network computing device, wherein the local memory defines an allocated portion of a main memory of the network computing device; and means for determining a logical NIC from the plurality of logical NICs based on which of the plurality of logical NICs is directly coupled to the determined one of the NUMA nodes.

24. The network computing device of claim 23, further comprising:

means for transmitting, by the logical switch, the network packet to the logical NIC;

means for enqueuing, by the logical NIC, at least a portion of the network packet into a queue of one or more queues of the logical NIC directly linked to the determined one of the NUMA nodes; and means for transmitting, by the logical NIC, the at least a portion of the network packet from the queue of the logical NIC to the determined one of the NUMA nodes.

25. The network computing device of claim 23, further comprising:

means for receiving an outbound network packet for transmission to a target computing device from one of the plurality of NUMA nodes;

means for determining a logical NIC of the plurality of logical NICs to which the outbound network packet corresponds;

means for enqueuing the outbound network packet into a queue of one of the plurality of logical NICs; and means for forwarding the outbound network packet to the target computing device based on an identifier of the target computing device.

* * * * *